United States Patent
Betz et al.

(10) Patent No.: US 9,630,588 B2
(45) Date of Patent: Apr. 25, 2017

(54) BELT TENSIONER FOR A SAFETY BELT SYSTEM

(71) Applicant: TRW Automotive GmbH, Alfdorf (DE)

(72) Inventors: Hans-Peter Betz, Bobingen (DE); Dominik Seitzer, Schwaebisch Gmuend (DE); Ruediger Karl, Weilheim (DE)

(73) Assignee: TRW Automotive GmbH (DE)

( * ) Notice: Subject to any disclaimer, the term of this patent is extended or adjusted under 35 U.S.C. 154(b) by 262 days.

(21) Appl. No.: 14/352,323

(22) PCT Filed: Oct. 22, 2012

(86) PCT No.: PCT/EP2012/004413
§ 371 (c)(1),
(2) Date: Apr. 17, 2014

(87) PCT Pub. No.: WO2013/060438
PCT Pub. Date: May 2, 2013

(65) Prior Publication Data
US 2014/0291432 A1    Oct. 2, 2014

(30) Foreign Application Priority Data
Oct. 27, 2011   (DE) .................. 10 2011 117 053

(51) Int. Cl.
*B60R 22/34*   (2006.01)
*B60R 22/46*   (2006.01)
*B60R 22/195*  (2006.01)

(52) U.S. Cl.
CPC .......... *B60R 22/46* (2013.01); *B60R 22/1952* (2013.01); *B60R 22/4619* (2013.01); *B60R 2022/468* (2013.01)

(58) Field of Classification Search
CPC ...... B60R 22/34; B60R 22/38; B60R 22/3408
See application file for complete search history.

(56) References Cited

U.S. PATENT DOCUMENTS 5,333,906 A * 8/1994 Fujimura ................ B60R 22/44
                                                    242/382.6
7,832,768 B2 * 11/2010 Singer ................. B60R 22/1952
                                                      280/806
2006/0145462 A1    7/2006 Singer

FOREIGN PATENT DOCUMENTS

| DE | 4429301 | 2/1996 |
| DE | 102006018455 | 10/2007 |
| DE | 102006018455 A1 | 10/2007 |
| DE | 102006018455 A1 | 10/2007 |
| WO | 2004/069614 | 8/2004 |

* cited by examiner

Primary Examiner — Sang Kim
(74) Attorney, Agent, or Firm — Tarolli, Sundheim, Covell & Tummino LLP (57) ABSTRACT

The invention relates to a belt tensioner (10) for a seat belt system comprising a belt shaft housing (18) and a belt shaft (12) pivoted in the belt shaft housing (18) about an axis (A), wherein prior to activation of the belt tensioner (10) the belt shaft (12) is retained in a torsionally fixed manner relative to the belt shaft housing (18) in at least one direction of rotation.

17 Claims, 7 Drawing Sheets

BELT TENSIONER FOR A SAFETY BELT SYSTEM

RELATED APPLICATIONS

This application corresponds to PCT/EP2012/004413, filed Oct. 22, 2012, which claims the benefit of German Application No. 10 2011 117 053.0, filed Oct. 27, 2011, the subject matter, of which are incorporated herein by reference in their entirety.

BACKGROUND OF THE INVENTION

The invention relates to a belt tensioner for seat belt systems in vehicles, especially an end fitting tensioner, comprising a belt shaft housing as well as a belt shaft being pivoted about an axis in the belt shaft housing.

Belt tensioners for seat belt systems are generally known already from automotive engineering. In so-called end fitting tensioners in the case of activation of the belt tensioner the actually fixed end of a webbing usually connected to the seat frame or the vehicle body is tightened in order to provide for tensioning of the entire webbing. In the state of the art both linearly operating as well as rotatory end fitting tensioners are described. In the rotatory end fitting tensioner the webbing end is connected to a belt shaft which is driven upon activation of the belt tensioner so as to wind webbing onto the belt shaft.

The generic DE 10 2006 018 455 A1 for example describes an end fitting tensioner consisting of a belt retractor receiving the end of the seat belt and of a tensioning device connected thereto for the belt shaft of the belt retractor. The belt shaft is accommodated in the belt shaft housing in a rotatable and radially movable manner. Due to the radial play the belt shaft can take a locked position in which the belt shaft is retained to be rotationally fixed relative to the belt shaft housing in the webbing extension direction, a release position in which the belt shaft is rotatable relative to the belt shaft housing in both directions, or any intermediate position. The belt shaft is radially moved to its locked position only by the force acting in the webbing extension direction upon rotation thereof, in which locked position an interlock configuration of the belt shaft interacts with a blocking toothing of the belt shaft housing.

The play of the belt shaft in the belt shaft housing present in the radial direction and in the circumferential direction can entail undesired noise development during driving operation. Moreover, in cases of restraint without activation of the belt tensioner rotation and/or radial displacement of the belt shaft relative to the belt shaft housing and thus an undesired release of belt webbing may occur.

SUMMARY OF THE INVENTION

It is the object of the invention to provide a belt tensioner quiet during running which reliably prevents undesired release of webbing in a case of restraint without activation of the belt tensioner.

This object is achieved by a belt tensioner of the type mentioned in the beginning in which prior to activating the belt tensioner the belt shaft is retained to be rotationally fixed in at least one direction of rotation relative to the belt shaft housing. In this way an undesired noise development during running can be reliably minimized or even completely eliminated.

Preferably the belt shaft is coupled to the belt shaft housing in a rotationally fixed manner, especially rotationally fixed in both directions of rotation, prior to activating the belt tensioner by a shear element. This rotationally fixed coupling between the belt shaft and the belt shaft housing during running reliably prevents undesired rattling of the belt tensioner by relative movements between the belt shaft and the belt shaft housing. Furthermore, by the rotationally fixed coupling between the belt shaft and the belt shaft housing inadvertent winding of webbing onto the belt shaft and, in the case of restraint, undesired unwinding of said webbing from the belt shaft can be reliably prevented.

In an embodiment of the belt tensioner, between the belt shaft and the belt shaft housing an interlock mechanism is provided which releases rotation of the belt shaft relative to the belt shaft housing in the tensioning direction and blocks the same in the opposite direction, i.e. in the webbing extension direction. This interlock mechanism thus permits tensioning of the webbing, but at the same time prevents release of webbing again after effectuated webbing tensioning.

The interlock mechanism is configured, for example, as ball locking including wedge bevels and locking balls interacting with the wedge bevels. The advantages of such ball locking reside in the short switching distance between a release position and a locked position of the belt shaft.

Alternatively, the interlock mechanism can also be an axial toothing between the belt shaft and the belt shaft housing. For instance, a first axial toothing is provided directly at the belt shaft housing or a locking element connected in a rotationally fixed manner to the belt shaft housing and a second axial toothing interacting with the first axial toothing is provided at a rope reel connected in a rotationally fixed manner to the belt shaft.

In another embodiment of the belt tensioner, the belt shaft is supported in the belt shaft housing to be radially movable between a locked position in which the belt shaft is retained in a rotationally fixed manner relative to the belt shaft housing in one direction of rotation and a release position in which the belt shaft is rotatable relative to the belt shaft housing in both directions of rotation.

The belt shaft or a component connected to be rotationally fixed to the belt shaft in this embodiment preferably includes a shear element engaging in a recess of the belt shaft housing and fixing the belt shaft in the locked position. So that the shear element reliably prevents both rotation and translation of the belt shaft relative to the belt shaft housing, the shear element engages in the recess of the belt shaft housing especially in a positive and accurately fitting manner.

Concretely speaking, an end cover in the form of a cast part and a rope reel in the form of a cast part can be arranged to be rotationally fixed at opposed axial ends of the belt shaft, wherein a shear element is integrally formed with the end cover and/or to the rope reel, which shear element engages in a recess of the belt shaft housing, preferably engages true to size, and fixes the belt shaft in the locked position. This detailed design of the belt tensioner is extremely advantageous, as a shear element can be integrally formed with the cast parts at minimum costs. An appropriate recess can be equally realized, for example by simple punching, at minimum costs in the belt shaft housing usually formed of sheet steel.

In embodiments of the belt tensioner in which the belt shaft is supported to be radially movable in the belt shaft housing between a locked position and a release position, preferably a spring element is provided which acts upon the belt shaft relative to the belt shaft housing radially into the locked position. After activating the belt tensioner and shearing a possible shear element, this spring element prevents rotation of the belt shaft relative to the belt shaft housing in the webbing extension direction.

Also in the embodiment of the belt tensioner including a belt shaft radially movably supported in the belt shaft housing an interlock mechanism is preferably provided between the belt shaft and the belt shaft housing, the interlock mechanism releasing rotation of the belt shaft relative to the belt shaft housing in the tensioning direction and locking the same in the opposite direction, i.e. in the webbing extension direction, wherein the belt shaft includes an external toothing which in the locked position is engaged in a substantially complementary internal toothing at the belt shaft housing.

Especially preferred the described belt tensioner is an end fitting tensioner in which one end of webbing is fixed at the belt shaft, wherein the belt shaft can be rotated relative to the belt shaft housing after activating the end fitting tensioner so as to wind up webbing.

In contrast to so called retractor tensioners in which a belt force limitation (e.g. by means of a torsion rod) is desired, in end fitting tensioners usually an unyielding rigid fixation of the webbing end is required. This requirement can be reliably met at low costs by the described belt tensioner both in restraint situations with activation of the belt tensioner as well as in restraint situations without activation of the belt tensioner.

BRIEF DESCRIPTION OF THE DRAWINGS

Further features and advantages of the invention are resulting from the following description of preferred embodiments with reference to the drawings, in which.

DESCRIPTION OF EXEMPLARY EMBODIMENTS

FIGS. 1 to 4 illustrate a belt tensioner 10 for a seat belt system in a vehicle, concretely speaking a so called end fitting tensioner, comprising a belt shaft 12 to which one end 14 of a webbing 16 is fixed and a belt shaft housing 18 adapted to be fixedly mounted on the body in which the belt shaft 12 is supported, wherein the belt shaft 12 can be rotated relative to the belt shaft housing 18 after activating the belt tensioner 10 so as to wind up webbing 16.

Figure 1:
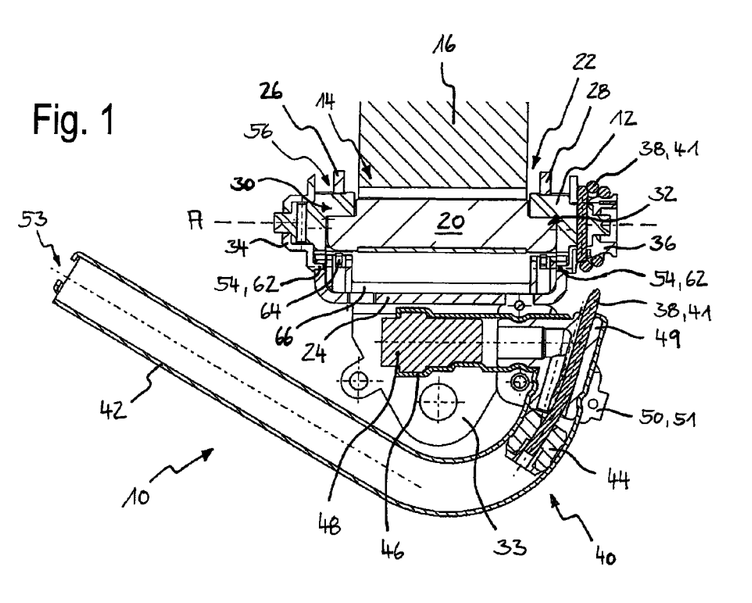
FIG. 1 shows an axial longitudinal section across a belt tensioner according to the invention.

In the shown embodiment the end 14 of the webbing 16 is stitched to form a loop enclosing a belt shaft inserting element 20, wherein the belt shaft inserting element 20 is received in a recess 22 of the belt shaft 12 and is supported relative to the belt shaft 12 in a rotationally fixed manner.

Figure 2:
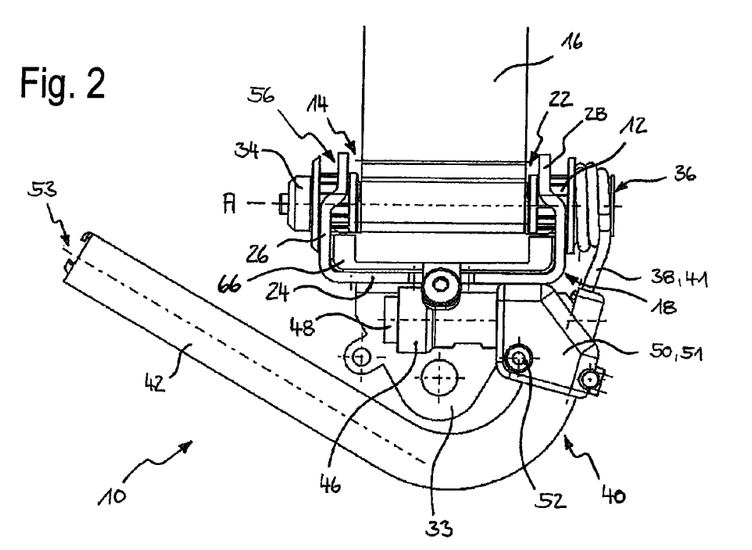
FIG. 2 shows a top view of the belt tensioner according to FIG. 1.
Figure 3:
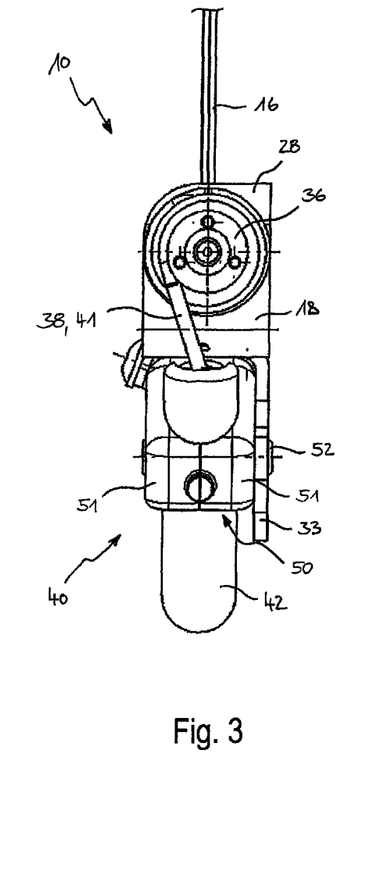
FIG. 3 shows a side view of the belt tensioner according to FIG. 1.
Figure 4:
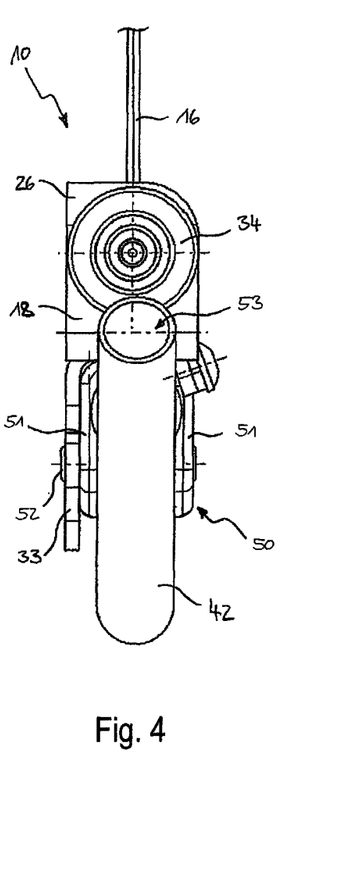
FIG. 4 shows another side view of the belt tensioner according to FIG. 1.

According to FIG. 2, the belt shaft housing 18 of the belt tensioner 10 is U-shaped and comprises a housing land 24 as well as two opposite housing legs 26, 28, each housing leg 26, 28 having a housing aperture 30, 32 through which the belt shaft 12 extends. Furthermore, a securing strap 33 bent from the housing land 24 is provided through which the belt shaft housing 18 can be tightly connected, especially screwed to a vehicle seat or a vehicle body.

The belt shaft 12 is pivoted about an axis A in the belt shaft housing 18. At the axial ends of the belt shaft 12 an end cover 34 and, resp., a rope reel 36 are disposed, the end cover 34 and the rope reel 36 being tightly connected, especially pressed to the belt shaft 12 and prevent axial movement of the belt shaft 12 relative to the belt shaft housing 18 or limit the same to minimum axial play.

In order to be able to tighten the webbing 16 upon activation of the belt tensioner 10 a force transmission element 38 is provided for coupling the belt shaft 12 to a tensioner drive 40. In the illustrated embodiment the force transmission element 38 is a pull rope 41 being partly wound on the rope reel 36 and fastened by one rope end to the rope reel 36.

The tensioner drive 40 of the belt tensioner 10 comprises a tensioner tube 42 for receiving and guiding a pressurizing element 44 as well as a separate generator housing 46 for receiving a gas generator 48. In the shown embodiment the generator housing 46 is a tube length so that both the tensioner tube 42 and the generator housing 46 are made of a metal tube, especially a steel tube. Moreover, a coupling element 49 is provided for tightly connecting the generator housing 46 to the tensioner tube 42 (cf. FIG. 1).

In order to reinforce the connection between the tensioner tube 42 and the generator housing 46 as well as to provide a simple connection between the tensioner drive 40 and the belt shaft housing 18 a stabilizing unit 50 is provided for the rest. This stabilizing unit 50 in the present case comprises two stabilizing elements 51, especially made of zinc diecast, and a connecting element 52 in the form of a tubular rivet, for example.

The pressurizing element 44 according to FIG. 1 is a piston which is substantially sealed in the bent tensioner tube 42 and is accommodated to be movable along a tubular axis. The pull rope 41 secured to the rope reel 36 by one rope end extends from the rope reel 36 into the tensioner tube 42 and is secured to the piston there by an opposite rope end. After activating the gas generator 48, gas pressure is applied to the piston which moves in the direction of a free tube end 53 of the tensioner tube 42. While rotating the belt shaft 12, pull rope 41 is unwound from the rope reel 36 and at the same time webbing 16 is wound onto the belt shaft 12 so that belt tensioning takes place.

Prior to activation of the belt tensioner 10, the belt shaft 12 is retained to be rotationally fixed relative to the belt shaft housing 18 in at least one direction of rotation. Said at least one direction of rotation preferably is a webbing extension direction, wherein prior to activation of the belt tensioner 10 the belt shaft 12 is retained to be rotationally fixed relative to the belt shaft housing 18 especially preferred also in an opposite direction of rotation, i.e. in the tensioning direction of the belt tensioner 10.

According to FIG. 1, prior to activation of the belt tensioner 10 by a shear element 54, concretely speaking by a shear pin integrally formed with the end cover 34 and eccentrically with the rope reel 36, the belt shaft 12 is coupled to be rotationally fixed in both directions of rotation to the belt shaft housing 18. Between the belt shaft 12 and the belt shaft housing 18 an interlock mechanism 56 is provided which is adapted to release rotation of the belt shaft 12 relative to the belt shaft housing 18 in the tensioning direction and to lock said rotation in the opposite webbing extension direction.

A preferred embodiment of the interlock mechanism 56 is represented in FIGS. 5 to 8.

The belt shaft 12 is supported in the belt shaft housing 18 to be radially movable between a locked position (FIGS. 5 and 6) in which the belt shaft 12 is retained to be rotationally fixed relative to the belt shaft housing 18 in the webbing extension direction and a release position (FIGS. 7 and 8) in which the belt shaft 12 is rotatable relative to the belt shaft housing 18 in the webbing extension direction and in the tensioning direction. The interlock mechanism 56 is realized in this case so that at its axial ends the belt shaft 12 includes a proper external toothing 58 which is engaged in the locked position in a substantially complementary internal toothing 60 formed at the belt shaft housing 18.

Figure 5:
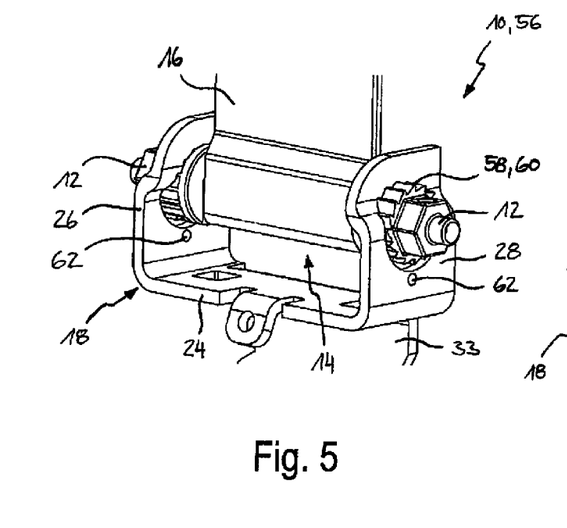
FIG. 5 is a perspective view of an interlock mechanism of the belt tensioner according to FIGS. 1 to 4 in a locked position.
Figure 6:
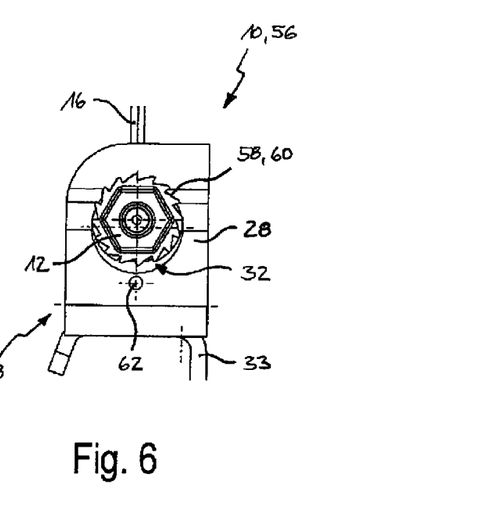
FIG. 6 shows a side view of the interlock mechanism according to FIG. 5.
Figure 7:
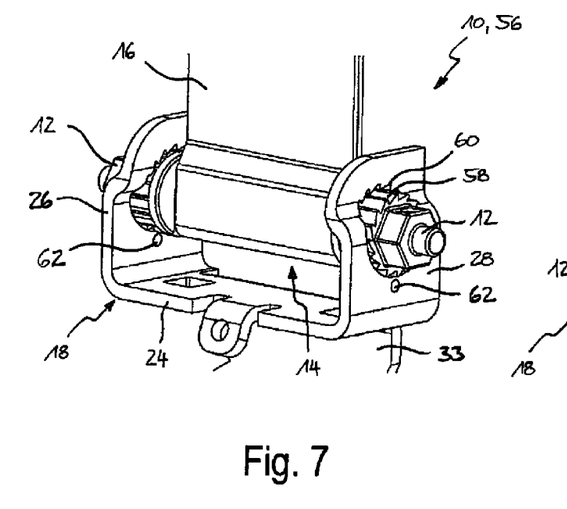
FIG. 7 is a perspective view of an interlock mechanism of the belt tensioner according to FIGS. 1 to 4 in a release position.
Figure 8:
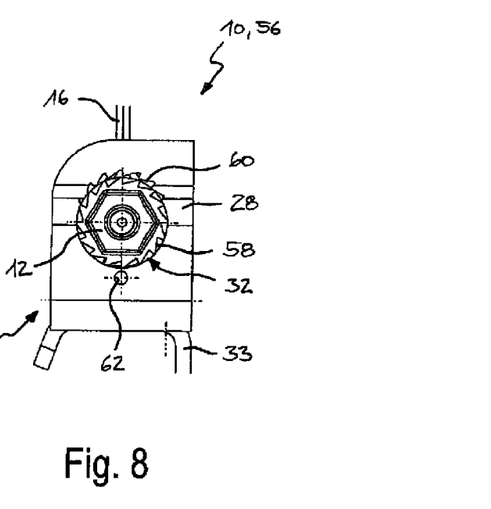
FIG. 8 shows a side view of the interlock mechanism according to FIG. 7.

In general, the belt shaft 12 or a component connected to the belt shaft 12 in a rotationally fixed manner includes the shear element 54 which engages in a recess 62 of the belt shaft housing 18 and fixes the belt shaft 12 in the locked position according to FIGS. 5 and 6.

In the embodiment according to FIG. 1, the end cover 34 formed as cast part and the rope reel 36 formed as cast part are arranged to be rotationally fixed at opposite axial ends of the belt shaft 12, wherein a respective shear element 54 is integrally formed both with the end cover 34 and with the rope reel 36 each shear element engaging in a recess 62 of the belt shaft housing 18 in an accurately fitting manner and fixing the belt shaft 12 in its locked position.

Figure 9:
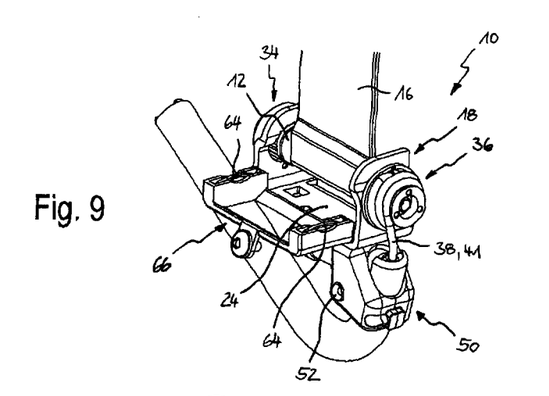
FIG. 9 is a perspective view of the belt tensioner according to FIGS. 1 to 4.

FIG. 9 illustrates a perspective view of the belt tensioner 10 according to FIGS. 1 to 4 when mounting a belt shaft retaining unit 66. In combination with the section across the assembled belt tensioner 10 according to FIG. 10 it becomes clear that the belt shaft retaining unit 66 includes a spring element 64 which acts upon the belt shaft 12 relative to the belt shaft housing 18 radially into the locked position according to FIGS. 5 and 6. The belt shaft retaining unit 66 serves as mounting control, as it can be inserted between the housing land 24 and the belt shaft 12 only when the belt shaft inserting element 20 is correctly positioned relative to the belt shaft 12. After being mounted the belt shaft retaining unit 66 then ensures that the belt shaft inserting element 20 remains in this position.

Summing up, the belt shaft 12 is thus fixed in its locked position already before activation of the belt tensioner 10 by the shear element 54 relative to the axis A in both directions of rotation as well as in the radial and tangential direction relative to the belt shaft housing 18. This ensures that also in a case of restraint of the seat belt system without activation of the belt tensioner 10 no webbing extension occurs at the end fitting tensioner. Such undesired webbing extension can occur in conventional end fitting tensioners by a radial movement of the belt shaft 12 relative to the belt shaft housing 18 in the webbing extension direction and/or a certain rotation of the belt shaft 12 relative to the belt shaft housing 18 in the webbing extension direction. In addition, fixation the belt shaft 12 relative to the belt shaft housing 18 by means of the shear element 54 also prevents undesired rattling noise of the belt tensioner 10 during running.

Upon activation of the belt tensioner 10 such high torque is applied to the belt shaft 12 by the pull rope 41 that the shear elements 54 arranged eccentrically with respect to the axis A shear at the end cover 34 and the rope reel 36. The belt shaft 12 then moves against the spring force of the spring element 64 radially into its release position and rotates relative to the belt shaft housing 18 in the tensioning direction. Thus pull rope 41 is unwound from the rope reel 36 and webbing 16 is wound onto the belt shaft 12 so that a belt tensioning takes place. The external toothing 58 of the belt shaft 12 ratchets over the internal toothing 60 of the belt shaft housing 18 formed at the rim segments of the housing apertures 30, 32.

Upon completion of the tensioning operation the spring element 64 ensures that the belt shaft 12 adopts its locked position according to FIGS. 5 and 6 again and in this way prevents undesired webbing extension.

Figure 10:
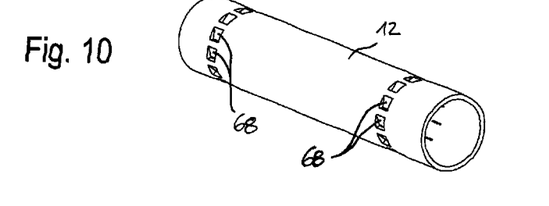
FIG. 10 is a perspective view of a belt shaft for the belt tensioner of the invention according to an alternative embodiment.

FIG. 10 shows a perspective view of the belt shaft 12 according to an alternative embodiment. In contrast to the embodiment according to FIGS. 1 to 9, the external toothing 58 of the belt shaft 12 is not formed by teeth radially protruding from the belt shaft 12 but by radial embossings 68.

Figure 11:
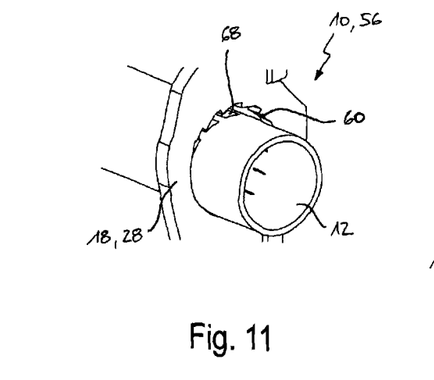
FIG. 11 shows a perspective detailed view of an interlock mechanism for a belt tensioner according to the invention including the belt shaft according to FIG. 10.
Figure 12:
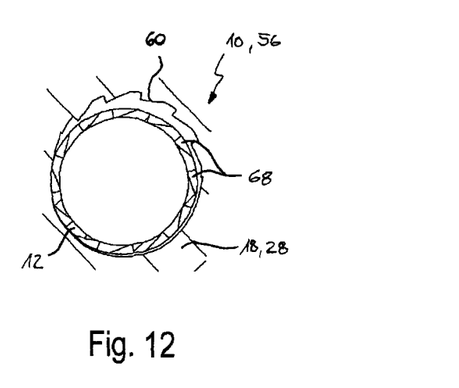
FIG. 12 shows a detailed section across the interlock mechanism according to FIG. 11.

FIGS. 11 and 12 show a perspective partial view as well as detailed section of the belt tensioner 10 in the area of the interlock mechanism 56 using the belt shaft 12 according to FIG. 10, wherein the belt shaft 12 is in its release position in each case. The afore-described functioning of the interlock mechanism 56 is not changed.

Figure 13:
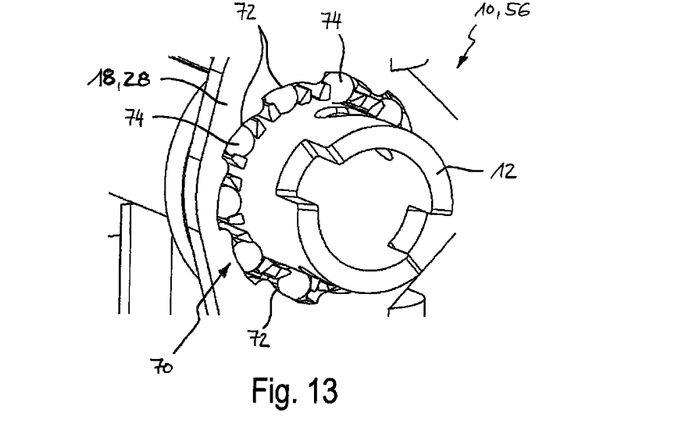
FIG. 13 shows a perspective detailed view of an interlock mechanism for the belt tensioner of the invention according to an alternative embodiment.
Figure 14:
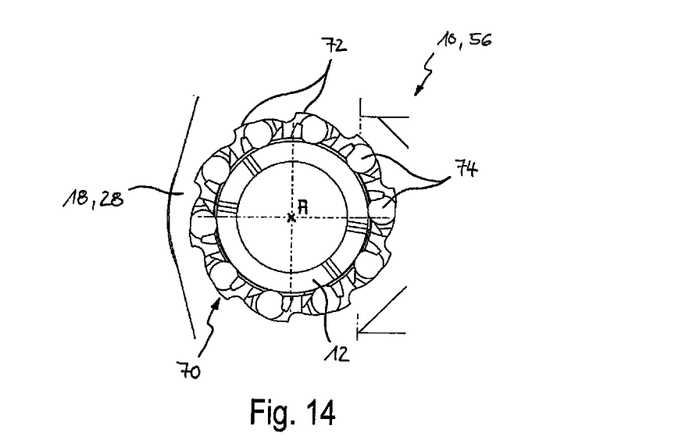
FIG. 14 is a detailed section across the interlock mechanism according to FIG. 13.

FIGS. 13 and 14 show cutouts of a belt tensioner 10 in which the interlock mechanism 56 is in the form of a ball locking 70, the ball locking 70 including wedge-shaped bevels 72 and locking balls 74 interacting with the wedge-shaped bevels 72.

The ball locking 70 permits relative rotation between the belt shaft 12 and the belt shaft housing 18, as the locking balls 74 in this direction of rotation are provided in a receiving area in which the radial distance between the belt shaft 12 and the belt shaft housing 18 is larger than a diameter of the locking balls 74. If, however, the belt shaft 12 is acted upon in the webbing extension direction, the wedge-shaped bevels 72 of the belt shaft housing 18 urge the locking balls 74 against the belt shaft 12 so that the belt shaft housing 18 and the belt shaft 12 block in a rotationally fixed manner.

In contrast to the belt tensioner 10 according to FIGS. 1 to 12, in a belt tensioner 10 having the interlock mechanism 56 according to FIGS. 13 and 14 the belt shaft 12 is supported to be not radially movable in the belt shaft housing 18.

Figures 15, 16:
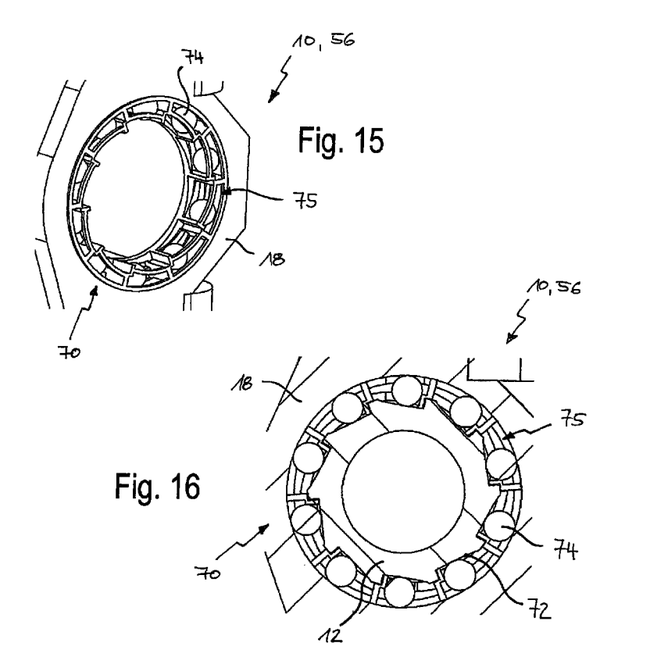
FIG. 15 is a perspective detailed view of an interlock mechanism for the belt tensioner of the invention according to an alternative embodiment.
FIG. 16 is a detailed section across the interlock mechanism according to FIG. 15.
Figure 17:
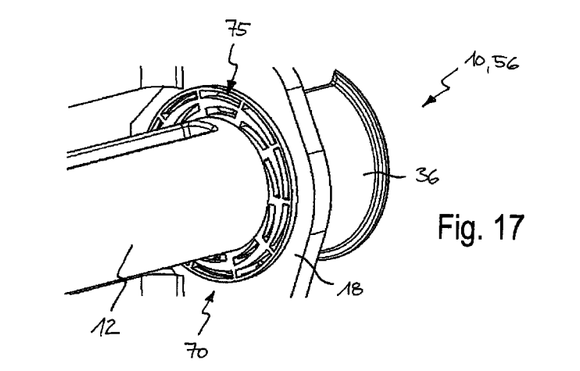
FIG. 17 shows a further perspective detailed view of the interlock mechanism according to FIG. 15.

FIGS. 15 to 17 illustrate an embodiment of the belt tensioner 10 in which the interlock mechanism 56 is equally in the form of a ball locking 70. In contrast to the embodiment according to FIGS. 13 and 14, the wedge-shaped bevels 72 are now formed at the belt shaft 12, while the locking balls 74 are provided in a receiving cage 75 disposed at the belt shaft housing 18.

Analogously to the belt tensioner 10 according to FIGS. 1 to 12, also in the embodiments including a ball locking 70 a shear element 54 can be provided which couples the belt shaft 12 to the belt shaft housing 18 in a rotationally fixed manner prior to activation of the belt tensioner 10.

Figure 18:
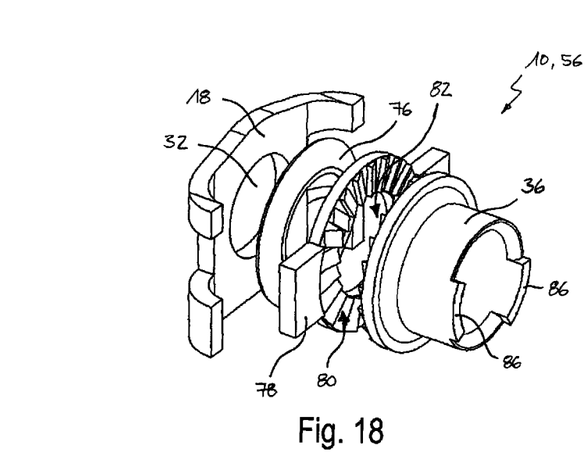
FIG. 18 shows a perspective exploded view of an interlock mechanism for the belt tensioner of the invention according to an alternative embodiment.
Figure 19:
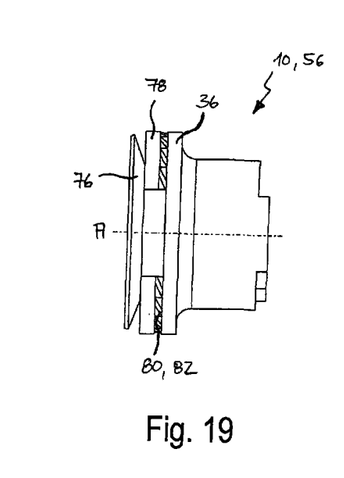
FIG. 19 is a side view of the interlock mechanism according to FIG. 18.
Figure 20:
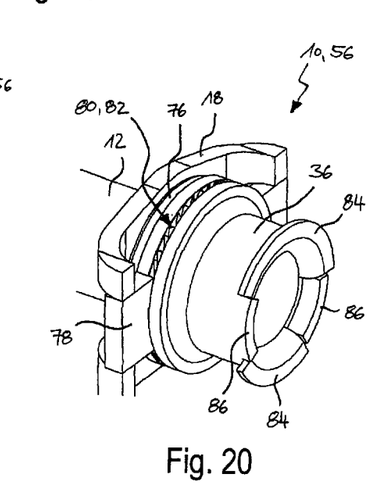
FIG. 20 is a perspective view of the interlock mechanism mounted on a belt shaft according to FIG. 18.

FIGS. 18 to 20 show another alternative embodiment of the interlock mechanism 56 for the belt tensioner 10. The interlock mechanism 56 in this case is in the form of an axial toothing between the belt shaft 12 and the belt shaft housing 18.

In FIG. 18 a perspective exploded view of the interlock mechanism 56 is shown comprising part of the belt shaft housing 18, a disk spring 76, a first locking element 78, which can be connected to the belt shaft housing 18 in a rotationally fixed manner and has an axial toothing 80, as well as the rope reel 36, which has an axial toothing 82 adjacent to the axial toothing 80 of the first locking element 78 and thus is in the form of a second locking element.

FIG. 19 illustrates the interlock mechanism 56 according to FIG. 18 in the assembled state.

FIG. 22 shows a perspective view of the interlock mechanism 56 mounted on the belt shaft 12 according to FIGS. 18 and 19. It is evident that at its axial end the belt shaft 12 includes radial projections 84 protruding in the circumferential direction accurately fittingly between axial projections 86 of the rope reel 36 and thus connecting the belt shaft 12 to the rope reel 36 in a rotationally fixed manner. Furthermore, the radial projections 84 act upon the second locking element in the form of the rope reel 36, the first locking element 78 and the disk spring 76 axially against the belt shaft housing 18. In the locked position of the belt shaft 12, i.e. when the axial toothings 80, 82 are in mesh, the disk spring 76 is not at all or only slightly deformed so that no or merely a small axial bias is present in the interlock mechanism 56. In any case the disk spring 76 exhibits a sufficiently large axial spring travel starting from the locked position according to FIGS. 19 and 20 so that the axial toothings 80, 82 can ratchet over each other during the tensioning operation while the disk spring 76 is tensioned.

Analogously to the belt tensioner 10 according to FIGS. 1 to 12, also in the embodiments comprising an axial toothing a shear element 54 can be provided for coupling the belt shaft 12 to the belt shaft housing 18 in a rotationally fixed manner prior to activation of the belt tensioner 10.

The invention claimed is:

1. A belt tensioner for a seat belt system, comprising
a belt shaft housing (18) and
a belt shaft (12) pivoted about an axis (A) in the belt shaft housing (18), wherein prior to activation of the belt tensioner (10) the belt shaft (12) is retained in a rotationally fixed manner relative to the belt shaft housing (18) in at least one direction of rotation, and wherein the belt shaft (12) is supported to be radially movable in the belt shaft housing (18) between a locked position in which the belt shaft (12) is retained to be rotationally fixed relative to the belt shaft housing (18) in one direction of rotation and a release position in which the belt shaft (12) is rotatable in both directions of rotation relative to the belt shaft housing (18).

2. The belt tensioner according to claim 1, wherein prior to activation of the belt tensioner (10) the belt shaft (12) is coupled to the belt shaft housing (18) in a rotationally fixed manner by a shear element (54).

3. The belt tensioner according to claim 1, wherein between the belt shaft (12) and the belt shaft housing (18) an interlock mechanism (56) is provided which is adapted to release rotation of the belt shaft (12) relative to the belt shaft housing (18) in the tensioning direction and to block rotation in the opposite direction.

4. The belt tensioner according to claim 1, wherein the belt shaft (12) or a component (34, 36) connected to the belt shaft (12) in a rotationally fixed manner includes a shear element (54) engaging in a recess (62) of the belt shaft housing (18) and fixing the belt shaft (12) in the locked position.

5. The belt tensioner according to claim 1, wherein an end cover (34) in the form of a cast part and a rope reel (36) in the form of a cast part are arranged to be rotationally fixed at opposite axial ends of the belt shaft (12), wherein a shear element (54) engaging in a recess (62) of the belt shaft housing (18) and fixing the belt shaft (12) in the locked position is integrally formed with the end cover (34) and/or the rope reel (36).

6. The belt tensioner according to claim 1, wherein a spring element (64) is provided which acts upon the belt shaft (12) relative to the belt shaft housing (18) radially into the locked position.

7. The belt tensioner according to claim 1, wherein between the belt shaft (12) and the belt shaft housing (18) an interlock mechanism (56) is provided which is adapted to release rotation of the belt shaft (12) relative to the belt shaft housing (18) in the tensioning direction and to lock rotation in the opposite direction, wherein the belt shaft (12) includes an external toothing (58) which in the locked position is engaged in a substantially complementary internal toothing (60) at the belt shaft housing (18).

8. The belt tensioner according to claim 1, wherein the belt tensioner (10) is an end fitting tensioner in which one end (14) of a webbing (16) is fixed to the belt shaft (12), wherein after activation of the end fitting tensioner the belt shaft (12) can be rotated relative to the belt shaft housing (18) so as to wind up webbing (16).

9. A belt tensioner for a seat belt system comprising:
an activatable tensioner drive;
a belt shaft housing; and
a belt shaft supported for rotation in the belt shaft housing about an axis in a first direction and a second direction opposite the first direction; the belt shaft being rotationally fixed relative to the housing prior to activation of the tensioner drive and moving radially relative to the axis from a locked position to a release position upon activation of the tensioner drive, the belt shaft being rotationally fixed in at least one of the first direction and the second direction when the belt shaft is in the locked position, and the belt shaft being rotatable in both the first direction and the second direction when the belt shaft is in the release position.

10. The belt tensioner according to claim 9, wherein rotation of the belt shaft relative to the belt shaft housing is fixed by a shear element prior to activation of the tensioner drive.

11. The belt tensioner according to claim 10, wherein the shear element is provided on the belt shaft or a component connected to the belt shaft, the shear element engaging in a recess provided on the belt shaft housing.

12. The belt tensioner according to claim 11, further comprising an end cover and a rope reel fixed for rotation at opposite ends of the belt shaft, the shear element being integrally formed on at least one of the end cover and the rope reel.

13. The belt tensioner according to claim 9, wherein an interlock mechanism is provided between the belt shaft and the belt shaft housing, the interlock mechanism being adapted to release rotation of the belt shaft relative to the belt shaft housing in one of the first direction and the second direction and to block rotation of the belt shaft relative to the belt shaft housing in the other one of the first direction and the second direction.

14. The belt tensioner according to claim 9, further comprising a spring element acting upon the belt shaft to bias the belt shaft into the locked position.

15. The belt tensioner according to claim 9, further comprising an interlock mechanism between the belt shaft and the belt shaft housing, the interlock mechanism being adapted to release rotation of the belt shaft relative to the belt shaft housing in one of the first direction and the second direction and to block rotation of the belt shaft relative to the belt shaft housing in the other one of the first direction and the second direction.

16. The belt tensioner according to claim 9, further comprising external toothing provided on the belt shaft and internal toothing provided at the belt shaft housing, the external toothing being engaged in the internal toothing when the belt shaft is in the locked position.

17. The belt tensioner according to claim 9, wherein the belt tensioner is an end fitting tensioner in which one end of a webbing is fixed to the belt shaft, and wherein after activation of the tensioner drive the belt shaft can be rotated relative to the belt shaft housing so as to wind up webbing.

* * * * *